Sept. 26, 1933.　　　　　M. LEUPOLD　　　　　1,928,566
POWER BRAKING AND CLUTCH RELEASING MECHANISM FOR AUTOMOTIVE VEHICLES
Filed March 18, 1930　　　4 Sheets-Sheet 1
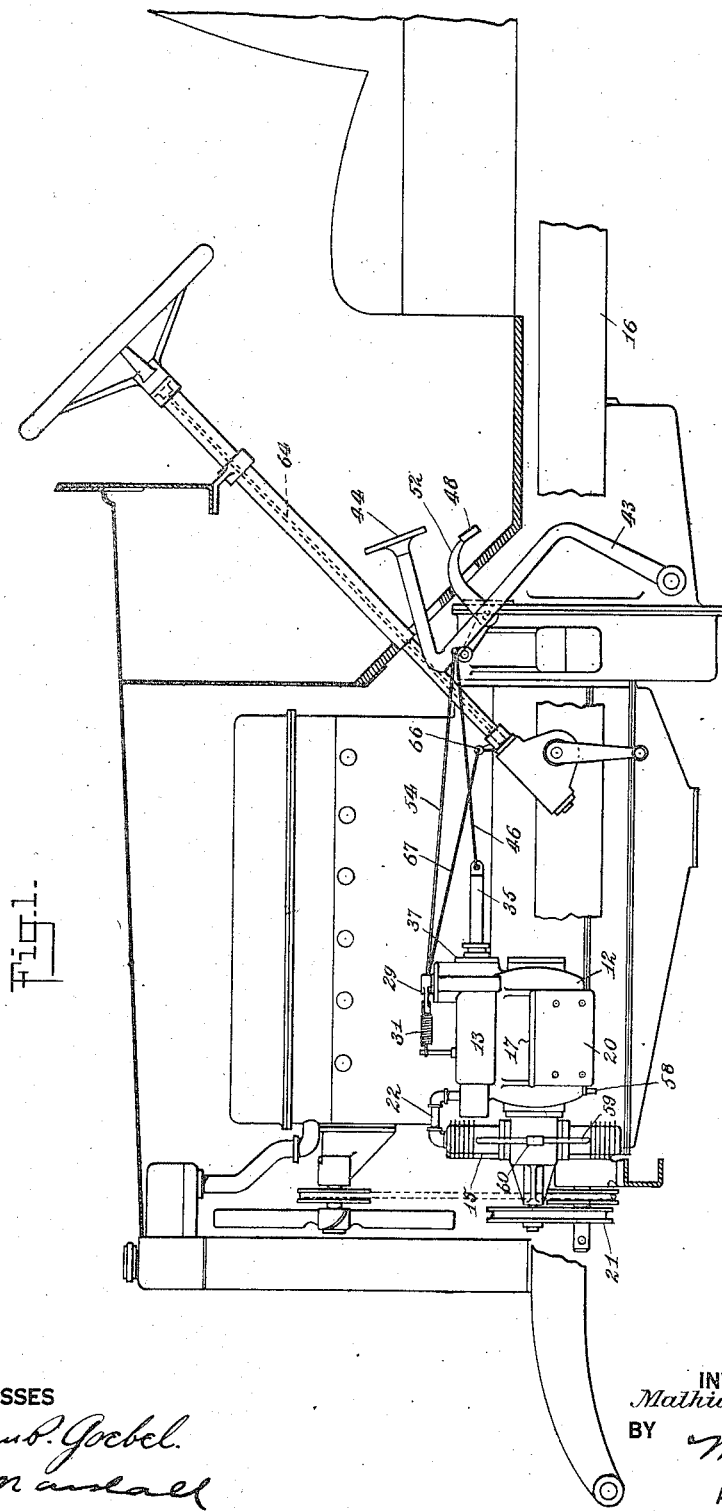

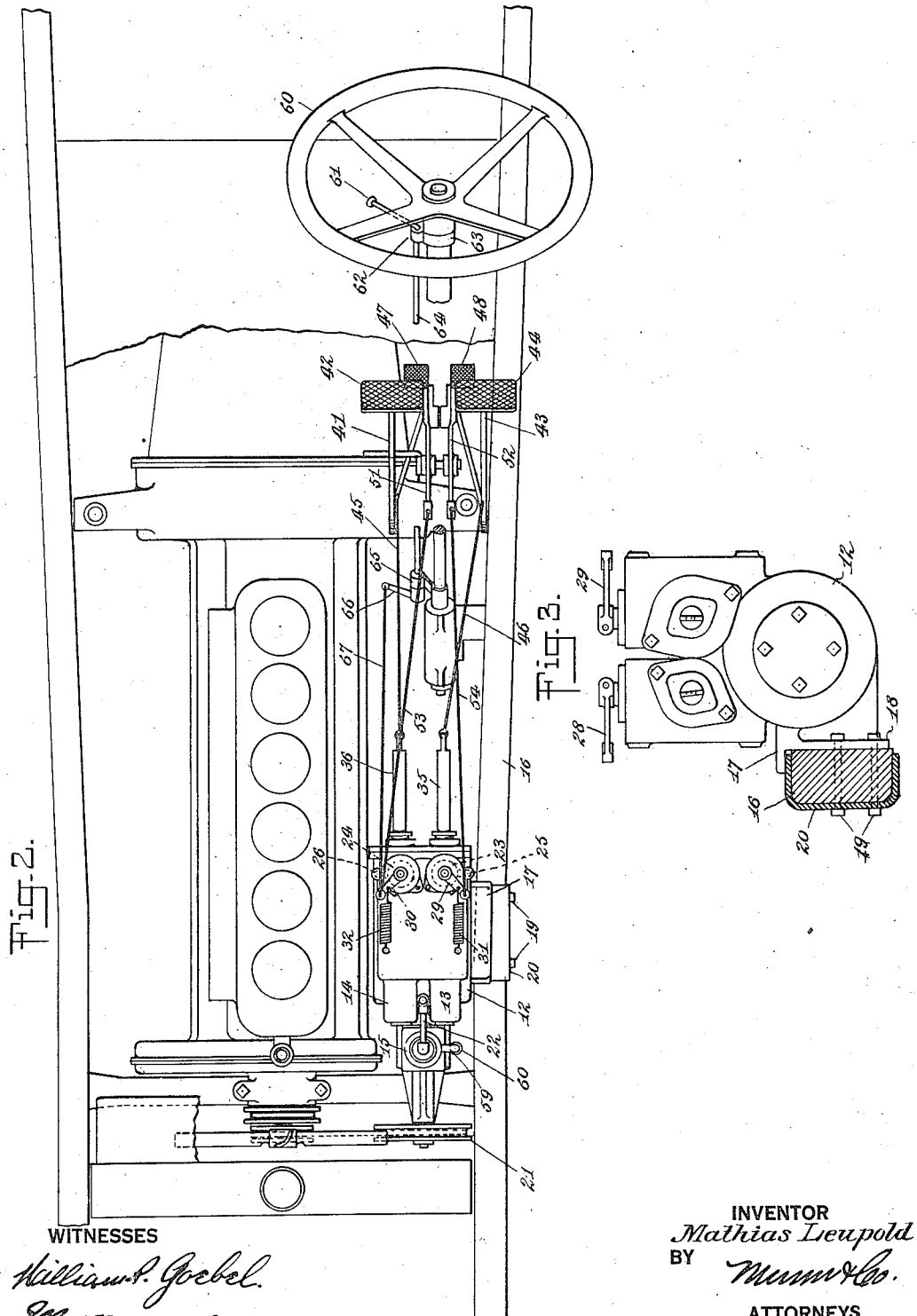

Sept. 26, 1933.  M. LEUPOLD  1,928,566
POWER BRAKING AND CLUTCH RELEASING MECHANISM FOR AUTOMOTIVE VEHICLES
Filed March 18, 1930  4 Sheets-Sheet 3
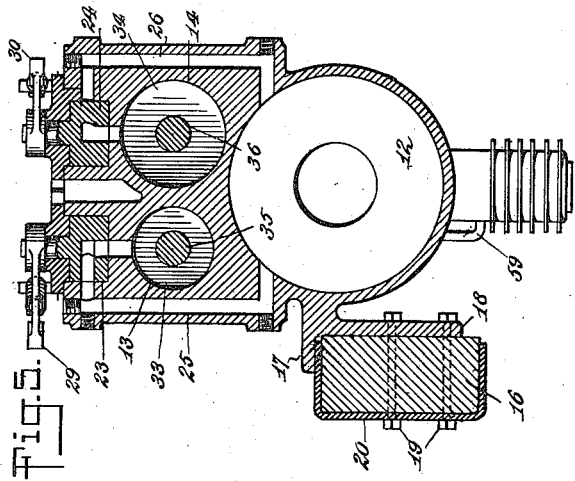
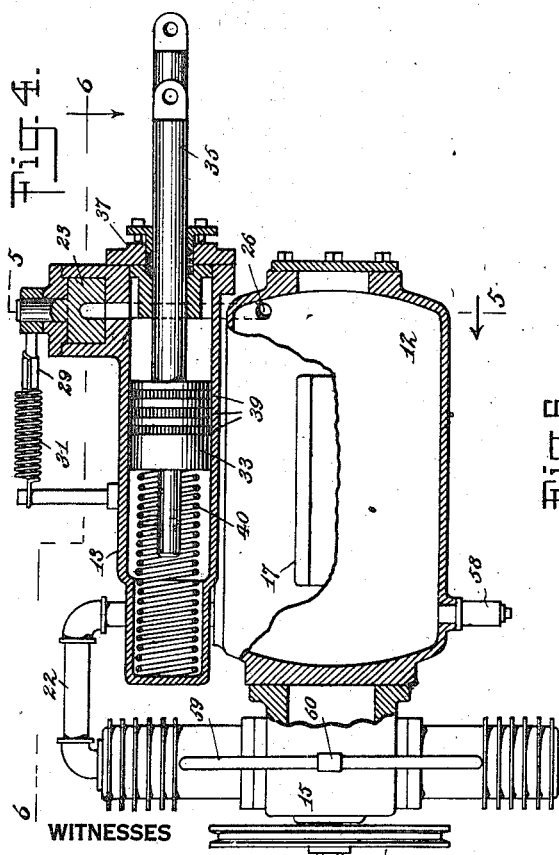
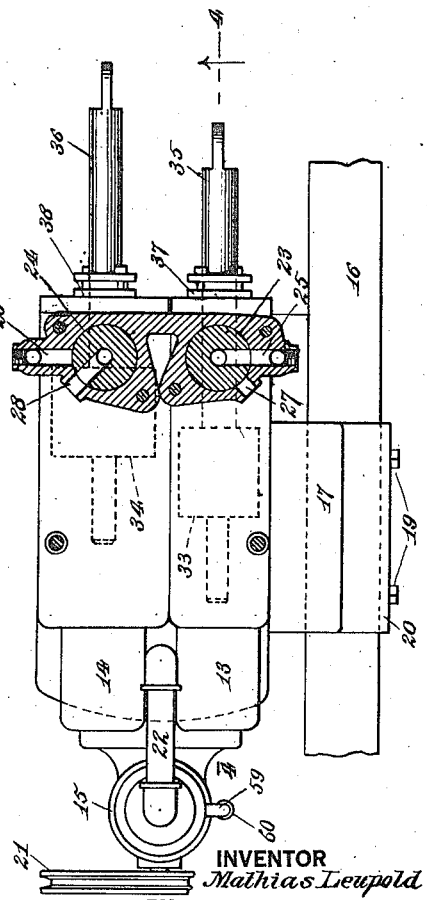
WITNESSES
INVENTOR
Mathias Leupold
BY
ATTORNEYS Sept. 26, 1933.      M. LEUPOLD      1,928,566
POWER BRAKING AND CLUTCH RELEASING MECHANISM FOR AUTOMOTIVE VEHICLES
Filed March 18, 1930      4 Sheets-Sheet 4
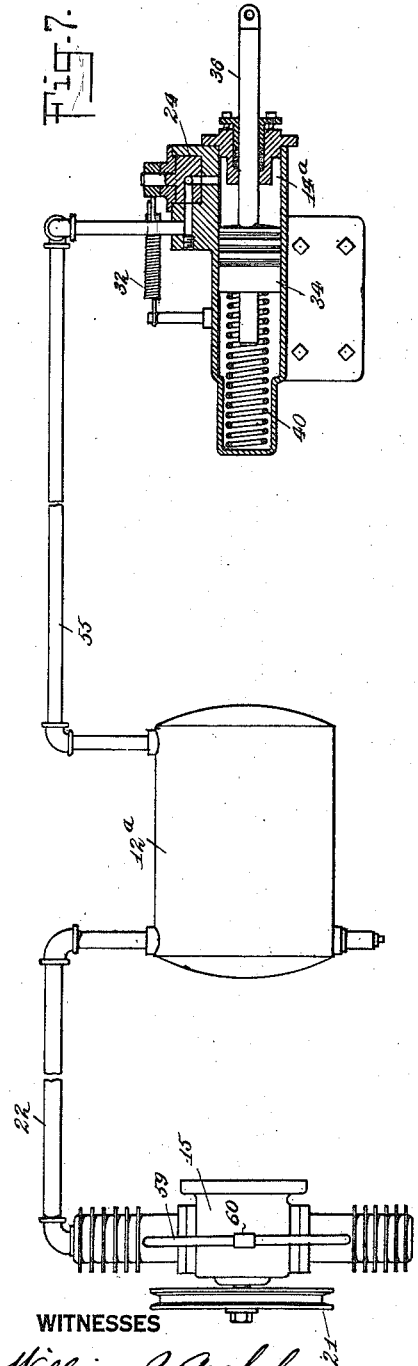
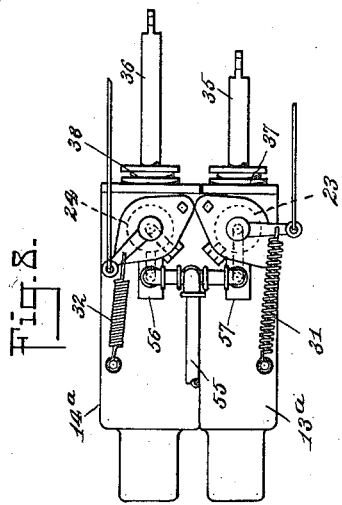
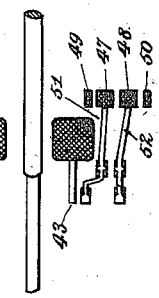
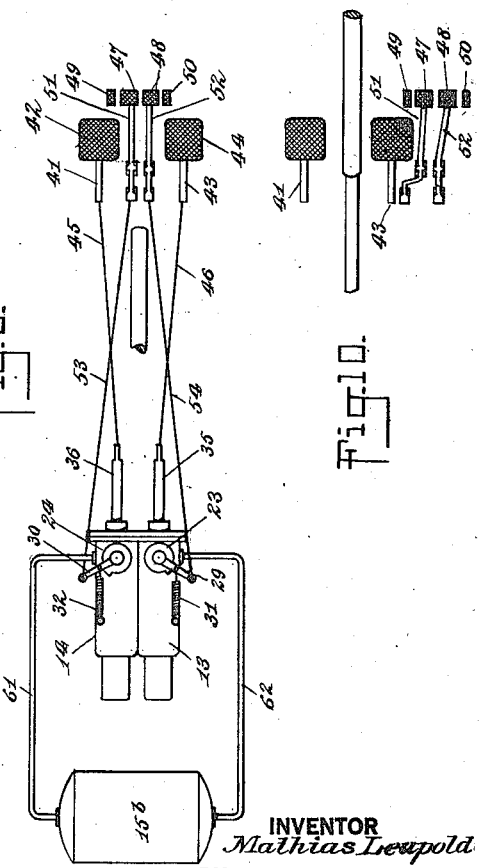
INVENTOR
Mathias Leupold
BY
ATTORNEYS
WITNESSES Patented Sept. 26, 1933

1,928,566

UNITED STATES PATENT OFFICE 1,928,566

POWER BRAKING AND CLUTCH RELEASING MECHANISM FOR AUTOMOTIVE VEHICLES

Mathias Leupold, New York, N. Y.

Application March 18, 1930. Serial No. 436,836

18 Claims. (Cl. 192—13)

My invention has for its object to provide power means for operating the brake and clutch mechanism for automotive vehicles which makes it possible for the driver to operate the mechanism readily by a slight movement of the power means controls.

Another object of the invention is to provide a pedal controlling the power means operating the brake and a separate pedal controlling the power means operating the clutch and to place these two pedals in close relationship so that they may be operated separately or together by one foot, while the other foot remains in contact with the accelerator.

Another object of the invention is to provide means which will make it possible to control the accelerator, the brake and the clutch of an automotive vehicle at all times without it being necessary for the driver to change his position or move his foot from the accelerator. The accelerator may, therefor, be operated at any time to prevent stalling, thereby keeping the automotive vehicle under perfect control at all times.

Another object of the invention is to retain the standard brake and clutch pedals and their connections, and to provide auxiliary pedals for controlling the power means. Therefore, the driver may use the auxiliary pedals to operate the brake and clutch mechanism when the engine is running and under normal conditions, while in cases of emergency, or when the engine is not running, or when the conditions are in other respects abnormal, the driver may operate the brake and the clutch by means of the standard brake and clutch pedals.

Another object of the invention is to provide pedals to operate the brake and clutch of an automotive vehicle, the connections being such that the driver may operate the pedals by a slight pressure thereon, and in this way make the brake and clutch pedals as easy to operate as is the standard accelerator.

Additional objects of the invention will appear in the following specification in which the preferred form of my invention is described.

In the drawings similar reference characters refer to similar parts in all the views in which.

Figure 1 is a fragmentary side section of an automotive vehicle showing the manner in which my invention is applied, Figure 2 is a plan view of Figure 1, Figure 3 is an enlarged view showing the manner for mounting the pressure chamber and the cylinders on an automotive vehicle chassis, Figure 4 is a sectional view on the line 4—4 of Figure 6, Figure 5 is a sectional view on the line 5—5 of Figure 4, Figure 6 is a sectional view on the line 6—6 of Figure 4, Figure 7 is a sectional diagrammatic view showing another arrangement of the pressure chamber in its relationship to the cylinders, Figure 8 is a plan view of the cylinders and valves as shown in Figure 7, Figure 9 is a diagrammatic view illustrating one manner in which the auxiliary pedals may be mounted with reference to the standard pedals, and Figure 10 is another diagrammatic view illustrating another manner in which the auxiliary pedals may be mounted relatively to the standard pedals.

In the standard automotive vehicle it is necessary for the driver to remove his foot from the accelerator to operate the brake when the clutch is also to be under control, which is usually the case. This not only often results in the stalling of the engine, but it is impossible to feed gas to the engine as the brake is released, which is often very desirable. The resulting loss of control of the automobtive vehicle is not only inconvenient, but often occasions awkward situations and sometimes accidents.

The standard automotive vehicle also has its brake and clutch pedals so mounted that a considerable movement of the pedals is required to operate the clutch and the brake and it is often difficult to release the clutch immediately as well as slowly when necessary.

In my present invention these objectionable features are eliminated, for my clutch and brake pedals are disposed closely together and may be engaged by one foot to operate both pedals at one time, or if desired, the foot may be shifted to operate either of the pedals independently of the other.

It is also possible to operate my brake and clutch pedals with a slight pressure and to release the clutch slowly and evenly, as may be desired.

By referring to the drawings it will be seen that the pressure chamber 12, the cylinder 13 and the cylinder 14 may be constructed as a unit and that attached thereto may be a pump 15 so that it may be possible to secure this complete unit to a part 16 of the automotive vehicle chassis in position for operation, the frame of the unit having a flange 17 disposed above the part 16 of the automotive vehicle chassis and a depending portion 18 at the inner side of the part 16, this depending portion 18 being secured to the part by means of bolts 19 which may extend not only through the part 16 and the portion 18, but also through openings in an enclosing member 20 which is disposed at the outer side and above and below the part 16, as illustrated in Figure 3 of the drawings.

The pump 15 has an operating pulley 21 which may be connected with the engine shaft, as illustrated in Fig. 2 of the drawings, by which means the pump may be rotated. This pump 15 has an outlet 22 leading to the pressure chamber 12, as illustrated in Figures 4 and 6 of the drawings.

As illustrated in Figures 4, 5 and 6 there are two valves 23 and 24 disposed preferably at the top of the cylinders 13 and 14, the unit enclosing the cylinders 13 and 14 having two communicating means 25 and 26, the communicating means 25 leading from the pressure chamber 12 to the valve 23 and the communicating means 26 leading from the pressure chamber 12 to the valve 24. The valve 23 also has an outlet port 27 leading to the atmosphere and the valve 24 has an outlet port 28 leading to the atmosphere.

It will be seen by referring to Figure 6 that if either of these valves 23 or 24 is rotated in one direction the valve will be moved from the position illustrated in connection with the valve 24 in Figure 6 to the position illustrated in connection with the valve 23 in the said figure, and that if the valve continues to rotate in the same direction the valve will be in a position to shut off communication, not only between its cylinder and the atmosphere, but it will also shut off communication between the pressure chamber 12 and its cylinder and will close all communication through the valve.

The valve 23 has an arm 29 and the valve 24 has an arm 30, resilient springs 31 and 32 being connected with these valve arms 29 and 30, as illustrated in the drawings, to hold the valves in a position as illustrated in Figure 6 of the drawings in connection with the valve 24, that is, the valve in a position to connect its cylinder with the atmosphere.

Disposed in each of the cylinders 13 and 14 there is a piston, the piston in the cylinder 13 being indicated by the reference character 33 and the piston in the cylinder 14 being indicated by the reference character 34, there being secured to these pistons piston rods 35 and 36 respectively, the piston rods 35 and 36 passing through the cylinder heads 37 and 38, the said cylinder heads 37 and 38 being provided with the usual stuffing boxes, and there being mounted on the pistons 33 and 34 piston rings 39, or any other suitable means to prevent the air under pressure to pass from one side of a piston to the other.

The pistons 33 and 34 are held adjacent the cylinder heads 37 and 38 by means of springs 40.

The automotive vehicle is preferably provided with the usual standard brake control means 41 with its pedal 42 and with the usual clutch control means 43 with its pedal 44, the piston rod 36 being connected with the brake control means 41 by a chain or link 45, which will serve to operate the brake control means 41 by means of a movement of the piston rod 36, but which will at the same time permit the operation of the standard brake control means 41 independently of the said piston rod 36. In the same way the piston rod 35 is connected with the standard clutch operating means 43 by a chain or link 46, by means of which the movement of the piston 33 away from its head 37 will serve to operate the clutch operating means 43, and will permit the standard clutch operating means 43 to be operated independently of the piston 33 and its piston head 35.

As will best be seen by referring to Figure 9 of the drawings, I provide an auxiliary brake pedal 47 and an auxiliary clutch pedal 48, these pedals 47 and 48 being disposed closely together and being small so that it will be possible to operate the two pedals 47 and 48 with one foot and at one time, or if desired, the driver may slip his foot to the right and merely operate the auxiliary brake pedal 47, or by slipping his foot to the left merely operate the auxiliary clutch pedal 48.

Stops 49 and 50 are preferably provided which serve to prevent the foot of the driver from slipping too far to the right or too far to the left to operate the one pedal 47 or the other pedal 48, or if desired, both pedals 47 and 48 simultaneously and with one foot.

The pedal 47 is mounted on a lever 51 and the pedal 48 is mounted on a lever 52, the levers 51 and 52 being pivoted to the automobile body, as illustrated in Figure 1 of the drawings. The lever 51 is connected by means of a cord or link 53 with the valve arm 30 and the lever 52 is connected by means of a cord or link 54 with the valve arm 29.

In driving the automotive vehicle the driver will keep his right foot at all times on the accelerator (not shown) and will have his left foot at the pedals 47 and 48 so that without moving his right foot from the accelerator, with his left foot he may operate either of the pedals 47 and 48, the pedals 47 and 48 being so mounted that neither of them will have more than about two inches of movement, and if desired, less than this possible movement. By a slight depression of the pedal 47 the valve arm 30 will be moved to move the valve 24 from a position where its cylinder 14 communicates with the atmosphere through the outlet port 28 to a position where this valve 24 will communicate with the communicating means 26 to permit the air, or other fluid under pressure in the compression chamber 12, to flow to the cylinder 14 and by which means the piston 34 will be moved against the resiliency of its spring, which will cause the piston rod 36, by means of the link or other means 45, to operate the standard brake control means 41.

It will be understood that the pressure operating on the brake control means 41 will only be increased while the valve 24 connects the compression chamber 12 with the cylinder 14 and, therefore, only a slight pressure on the pedal 47 should take place, for otherwise the valve 24 will be moved to a position, as has been explained, to cut off all communication to the cylinder 14 and the atmosphere through the outlet port 28 as well as the compression chamber.

Therefore, the pedal 47 should be depressed only slightly and should be kept in this position until the desired braking effect has been obtained, after which, if the brakes are to be continued in operation with this pressure, the pedal 47 should be pushed all the way downwardly to cut off communication between the cylinder 14 and the atmosphere, as well as the compression chamber 12 to retain the desired pressure in the cylinder 14.

When the brake is to be released the pressure is so removed from the pedal 47 that the spring in the cylinder 14 will press the piston 34 back in close proximity to the cylinder head 38.

It will also be understood that when the brakes are in operation and the valve has been moved to cut off communication to the cylinder 14 and the compression chamber 12 and it should be desired to increase the action of the brakes the pressure on the pedal 47 should be removed sufficiently to permit the spring to rotate the valve arm 30 to open communication again between the compression chamber 12 and the cylinder 14.

When the driver is desirous of throwing out the clutch the auxiliary clutch pedal 48 is pressed slightly downwardly when it will operate the valve 23, as has been explained, to open communication between the compression chamber 12 and the cylinder 13 by which means the piston 33 and the piston rod 35 through the cord or link 46 will operate the standard clutch control means 43. When sufficient air has been permitted to flow in the cylinder 13 to operate the piston 33 the auxiliary clutch pedal 48 may be pressed all the way downwardly to shut off further communication between the compression chamber 12 and the cylinder 13.

Of course, the clutch is released by removing the pressure from the auxiliary clutch pedal 48 which will permit the spring in the cylinder 13 to move the piston 37 in the direction of the cylinder 13, which will return the standard clutch control means to its former position.

As has been stated, the pump 15, the compression chamber 12, together with the cylinders 13 and 14, and the valves 23 and 24 are preferably provided as one unit and this unit is mounted on the automotive vehicle chassis frame, as has been suggested. However, in certain cases it may be necessary to install a compression chamber 12ª in one place, while a pump 15ª is disposed in another place, and the cylinders 13ª and 14ª are disposed at still another place on the automotive vehicle chassis.

This possible arrangement of the parts of the structure is illustrated in Figures 7 and 8 of the drawings.

The compression chamber 12ª communicates by means of a pipe 55 with valve chambers 56 and 57 leading to the valves 24 and 23, as will best be seen by referring to Figure 8 of the drawings. In all other respects the operation of the form of the invention as illustrated in Figures 7 and 8 of the drawings corresponds with the struction and operation of the invention as has already been set forth in full.

It will be understood that in some arrangements of the parts it will only be necessary to provide a relatively small compression chamber and this will be true where the pump is connected to the engine shaft so that a continuous air structure may be maintained in reserve. This will, of course, reduce the cost of the equipment and will avoid a cumbersome compression tank and will permit the combination of the compression tank with the cylinders as one unit and, if desired, as one casting.

The compression chamber 12 is preferably provided with a relief valve 58, which is adjusted to open when the pressure in the compression chamber reaches a predetermined point. A by-pass 59 may also be connected adjacent the inlet and outlet of the pumps and a relief valve 60 may be disposed in this by-pass 59 so that when the pressure in the compression chambers 12 and 12ª reaches a predetermined point the pump 15 or the pump 15ª will rotate relatively freely with the air passing through the by-pass 59.

Figure 9 shows another arrangement of the compression chamber 15ᵇ, the compression chamber 15ᵇ having a communicating means 61 leading to the valve 24 and a communicating means 62 leading to the valve 23, the operation of this arrangement being the same as has been described with reference to the other figures.

As will be seen by referring to Figures 1 and 2 of the drawings an additional brake operating means is mounted on the steering wheel 60. This additional brake operating means is operated by a hand lever 61 pivoted in a bearing 62 mounted on the steering wheel bearing 63, the hand lever 61 serving to rock the rod 64 journaled in a bearing 65, an arm 66 being mounted on the rod 64 and the arm 66 being connected by a wire or cord 67 with the arm 30 on the valve 24. The brakes may therefore be applied by a slight movement of the hand lever 61 through the mechanism described.

What is claimed is:

1. In an automotive vehicle, a control means having operating means, a cylinder, a piston in the cylinder, means connecting the piston with the control means for operating the latter, a valve for the cylinder for connecting the cylinder with an inlet and with an outlet, and means to move the valve in one direction from the outlet to the inlet and then to a position to close the valve.

2. In an automotive vehicle, a control means having operating means, a cylinder, a piston in the cylinder, means connecting the piston with the control means for operating the latter and which will permit the operation of the control means independently of the piston, a valve for the cylinder for connecting the cylinder with an inlet and with an outlet, and means to move the valve in one direction from the outlet to the inlet and then to a position to close the valve.

3. In an automotive vehicle, a control means having operating means, a compression chamber, a cylinder, a communicating means connecting the compression chamber with the cylinder, a valve in the communicating means adapted to move in one direction from a position to connect the cylinder with the atmosphere to a position to connect the compression chamber with the cylinder and beyond the second mentioned position to close communication from the cylinder, a piston in the cylinder, means connecting the piston with the control means, and means to operate the valve.

4. In an automotive vehicle, a control means having operating means, a compression chamber, a cylinder, a communicating means connecting the compression chamber with the cylinder, a valve in the communicating means adapted to move in one direction from a position to connect the cylinder with the atmosphere to a position to connect the pressure chamber with the cylinder and beyond the second mentioned position to close communication from the cylinder, a piston in the cylinder, means connecting the piston with the control means, means to move the valve in said direction, and resilient means to move the valve in the opposite direction.

5. In an automotive vehicle, a control means having operating means, a compression chamber, a cylinder, a communicating means connecting the compression chamber with the cylinder, a valve in the communicating means adapted to move in one direction from a position to connect the cylinder with the atmosphere to a position to connect the pressure chamber with the cylinder and beyond the second mentioned position to close communication from the cylinder, a piston in the cylinder, means connecting the piston with the control means, means to move the valve in said direction, and resilient means for holding the piston yieldingly in a predetermined position in the cylinder.

6. In an automotive vehicle, a clutch control having a pedal, a brake control having a pedal, power means for operating the clutch control which permits the clutch control to operate independently of the power means, power means for operating the brake control which permits the brake control to operate independently of the second mentioned power means, two auxiliary pedals spaced side by side to be operated together by one foot, means connecting one of the auxiliary pedals with one power means for operating the latter, and means connecting the other auxiliary pedal with the other power means for operating the latter the third and fourth mentioned means being each operable independently of the other.

7. In an automotive vehicle, a clutch control having a pedal, a brake control having a pedal disposed at the side of the first mentioned pedal and spaced therefrom, power means for operating the clutch control which permits the clutch control to operate independently of the power means, power means for operating the brake control which permits the brake control to operate independently of the second mentioned power means, two auxiliary pedals spaced side by side and rearwardly of and between the first two mentioned pedals, means connecting the auxiliary pedal nearest the pedal on the clutch control with the first mentioned power means, and means connecting the other auxiliary pedal with the second mentioned power means.

8. In an automotive vehicle, a clutch control having a pedal, a brake control having a pedal disposed at the side of the first mentioned pedal and spaced therefrom, power means for operating the clutch control which permits the clutch control to operate independently of the power means, power means for operating the brake control which permits the brake control to operate independently of the second mentioned power means, two auxiliary pedals spaced side by side to be operated together or independently by a foot disposed over the two auxiliary pedals, the two auxiliary pedals extending rearwardly of and between the first two mentioned pedals, means connecting the auxiliary pedal nearest the pedal on the clutch control with the first mentioned power means, means connecting the other auxiliary pedal with the second mentioned power means, and two stops, one at the outer side of each auxiliary pedal.

9. In an automotive vehicle, a clutch control having a pedal, a brake control having a pedal, two cylinders, pistons in the cylinders respectively, springs in the cylinders for holding the pistons yieldingly in predetermined positions, two links connecting the pistons with the controls respectively, two valves, one for each cylinder, springs for holding the valves in predetermined positions, two auxiliary pedals disposed side by side to be operated by one foot, and links connecting the auxiliary pedals with the valves respectively.

10. In an automotive vehicle, a control means having operating means, a cylinder, a piston in the cylinder, means connecting the piston with the control means for operating the latter, a valve for the cylinder for connecting the cylinder with an inlet port and with an outlet port, and means to move the valve in one direction from one port to the other port and then to a position to close both ports.

11. In an automotive vehicle, a brake mechanism, a clutch mechanism, fluid pressure means for operating the first and second mentioned mechanisms, pedals disposed side by side and operable by one foot controlling the fluid pressure means, and two stops, one disposed at the outer side of each pedal to limit the movement of the foot laterally relatively to the pedals.

12. In an automotive vehicle, a brake mechanism, a clutch mechanism, fluid pressure means for operating the first and second mentioned mechanisms, and pedals disposed close together and side by side to be operated by one foot, the pedals being connected with the fluid pressure means for controlling the brake mechanism and the clutch mechanism.

13. In an automotive vehicle, a brake mechanism, a clutch mechanism, means for operating the first and second mentioned mechanisms, two pedals disposed side by side and operable by one foot controlling the said means, and two stops, one disposed at the outer side of each pedal to limit the movement of the foot laterally relatively to the pedals.

14. In an automotive vehicle, a control mechanism, a second control mechanism, means for operating the first and second mentioned control mechanisms, two pedals disposed side by side and operable independently or together by one foot controlling the said means, and two stops, one disposed at the outer side of each pedal to limit the movement of the foot laterally relatively to the pedals.

15. In an automotive vehicle, a clutch control having a pedal, a brake control having a pedal disposed at the side of the first mentioned pedal and spaced therefrom, power means for operating the clutch control, which permits the clutch control to operate independently of the power means, power means for operating the brake control, which permits the brake control to operate independently of the second mentioned power means, two auxiliary pedals spaced side by side, means connecting one of the auxiliary pedals with the first mentioned power means, and means connecting the other auxiliary pedal with the second mentioned power means.

16. In an automotive vehicle, a clutch control having a pedal, a brake control having a pedal disposed at the side of the first mentioned pedal and spaced therefrom, power means for operating the clutch control, which permits the clutch control to operate independently of the power means, power means for operating the brake control, which permits the brake control to operate independently of the second mentioned power means, two auxiliary pedals spaced side by side to be operated independently or together by a foot disposed over the two auxiliary pedals, means connecting one of the auxiliary pedals with the first mentioned power means, means connecting the other auxiliary pedal with the second mentioned power means, and two stops, one disposed at the outer side of each auxiliary pedal.

17. An automotive vehicle having an engine in which fluids enter and leave the engine, a brake cylinder, a clutch cylinder, means connected with the cylinders in which the pressure is altered by the flow of the fluids, valves at the connections between the said means and the cylinders, two pedals disposed close together and side by side to be operated by one foot, means connecting the pedals with the valves respectively, a brake control, means operable by pressure in the brake cylinder to operate the brake control, a clutch control, and means operable by pressure in the clutch cylinder to operate the clutch control.

18. In an automatic vehicle, a brake control mechanism, a clutch control mechanism, two pedals disposed close together and side by side to be operatively engaged at the same time by one foot, and means connecting the pedals respectively with the brake control mechanism and the clutch control mechanism for operating the latter.

MATHIAS LEUPOLD.